July 6, 1965 G. H. JONES 3,192,600
CLAMP FOR MACHINE TOOL
Filed Aug. 28, 1961 4 Sheets-Sheet 3
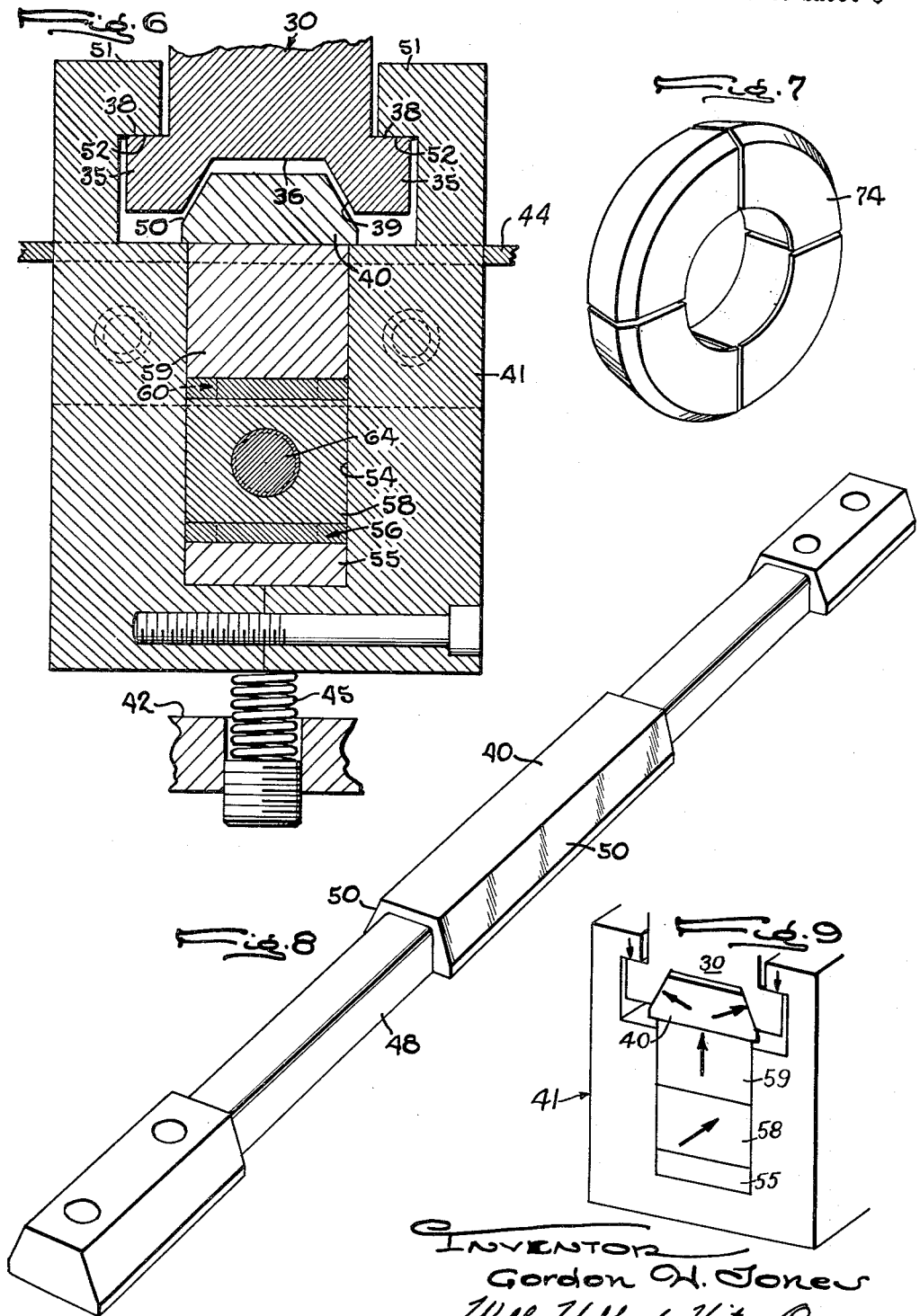
INVENTOR
Gordon H. Jones
Wolf, Hubbard, Voit & Osann
ATTORNEYS July 6, 1965
G. H. JONES
3,192,600
CLAMP FOR MACHINE TOOL
Filed Aug. 28, 1961
4 Sheets-Sheet 4
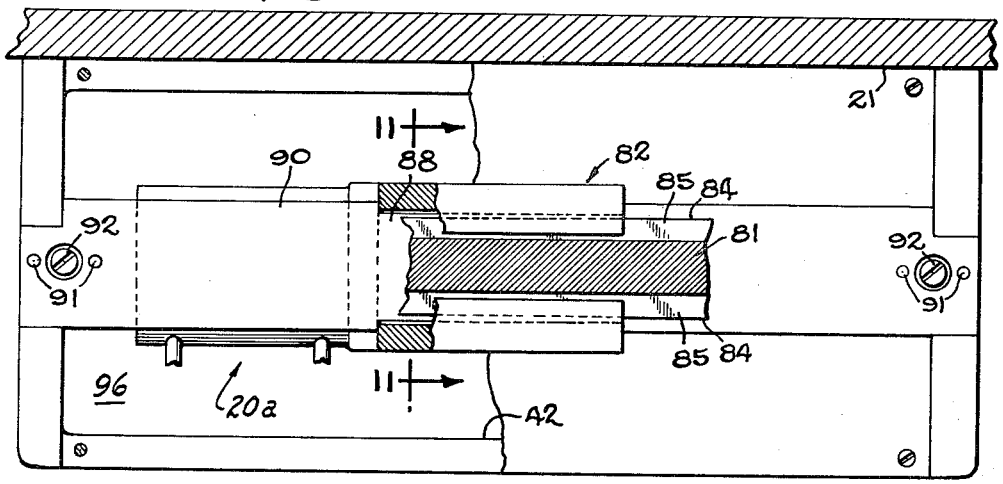
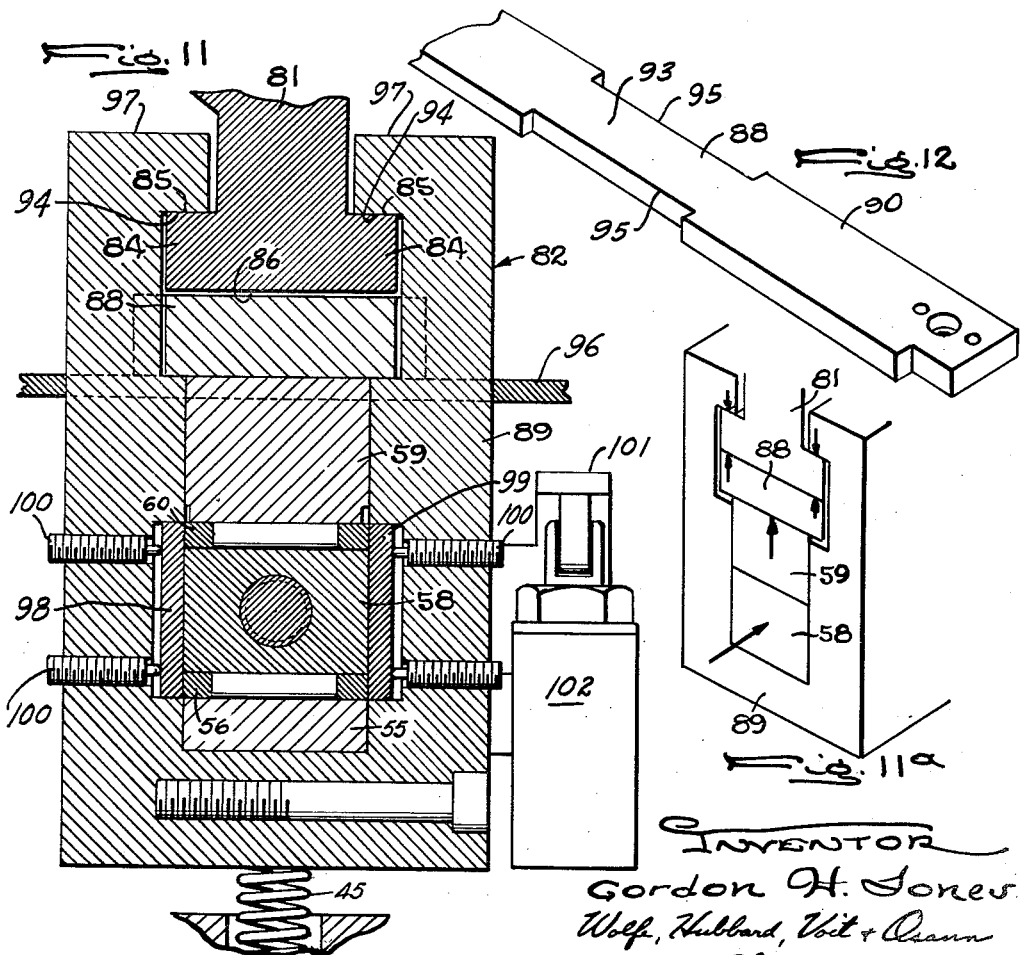
INVENTOR
Gordon H. Jones
Wolf, Hubbard, Voit & Osann
ATTORNEYS

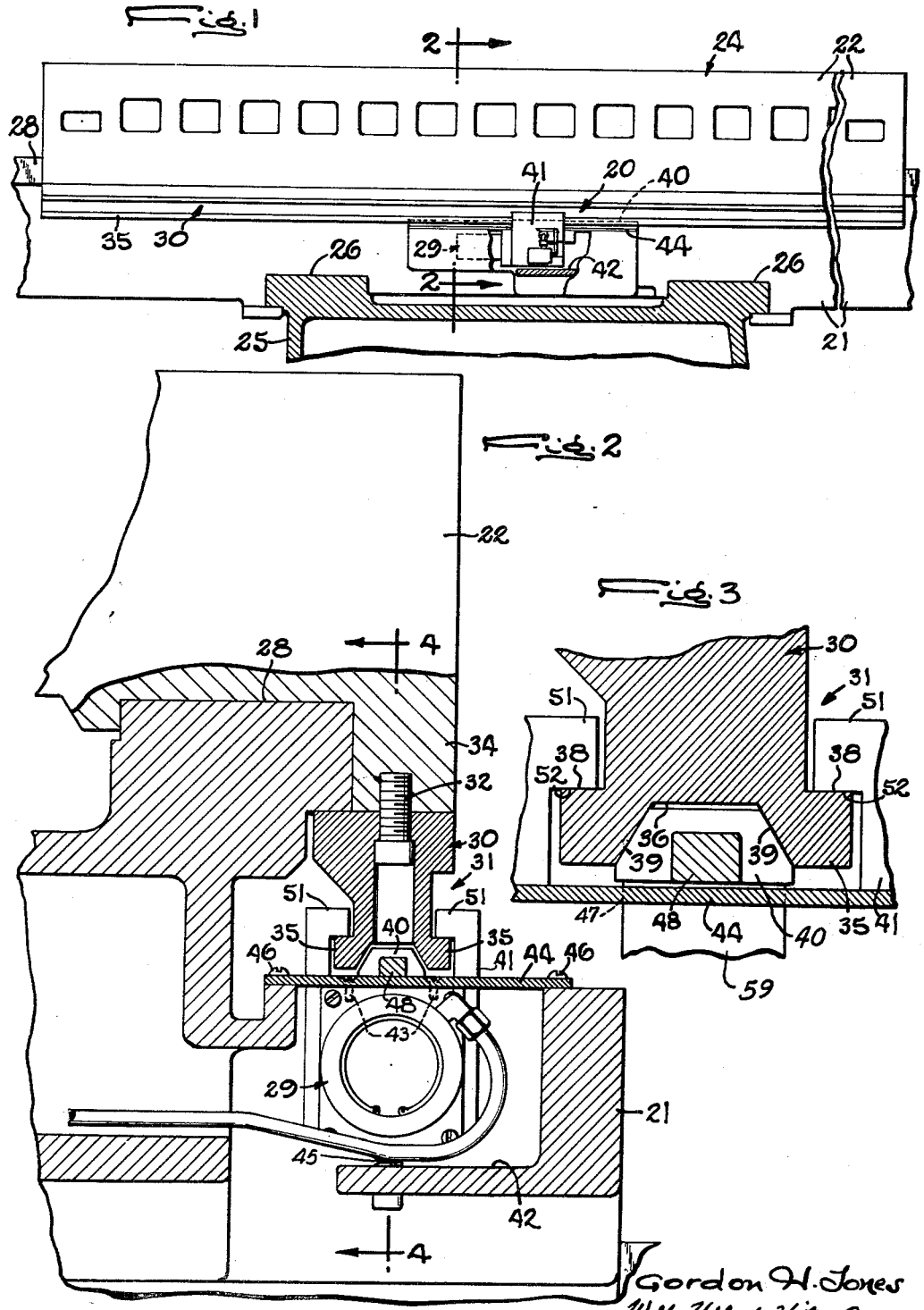

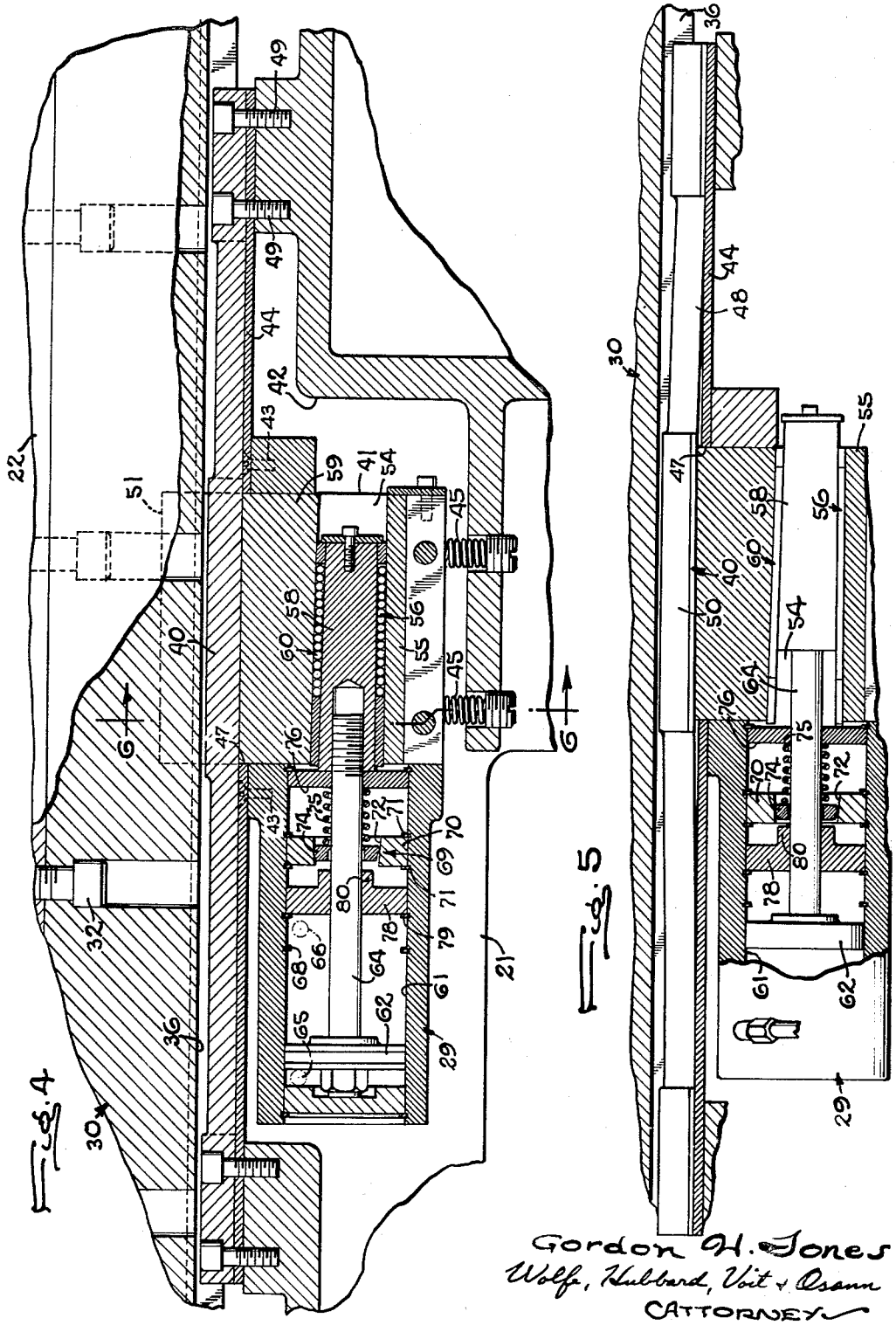

United States Patent Office 3,192,600
Patented July 6, 1965

3,192,600
CLAMP FOR MACHINE TOOL
Gordon H. Jones, Fond du Lac, Wis., assignor to Giddings & Lewis Machine Tool Company, Fond du Lac, Wis., a corporation of Wisconsin
Filed Aug. 28, 1961, Ser. No. 134,449
13 Claims. (Cl. 29—1)

The present invention relates generally to improvements in machine tools having one or more machine elements or subassemblies mounted for relative sliding movement with respect to each other and, more particularly to a novel clamp unit rigidly yet releasably securing two such relatively slidable elements together in any selected position within the limits of their relative movement.

One object of the present invention is to provide a machine tool clamp unit of the character set forth and adapted for operation independently of the load bearing slideways of the machine elements associated therewith to clamp or release without deflecting or disturbing the machine elements in any way.

Another object of the invention is to provide a clamp unit of the foregoing type utilizing balanced clamping elements and lubricant-free frictional clamping surfaces.

A further object of the invention is to provide a clamp unit of the above type having relatively high clamping efficiency, utilizing a combined antifriction and wedge force applying arrangement requiring only a moderate applied force to develop a substantial clamping force.

Another object is to provide a clamp unit of the foregoing nature utilizing an antifriction force applying mechanism with a latch-in arrangement, making it non-reversible until deliberately released.

Still another object of the invention is to provide a machine tool clamping device actuated by fluid pressure and further operable to maintain the elements in clamped position independently of any actuating pressure, and including fluid pressure responsive means adapted to override the clamping device for effecting release thereof.

A further object of the invention is to provide a clamp unit of the character set forth which may conveniently be preassembled as a separate operating unit and thereafter installed on a machine tool in a protective enclosure to facilitate reliable operation.

Other objects and advantages will become apparent from the following detailed description taken together with the accompanying drawings, wherein:

FIGURE 1 is an elevational view of a table and saddle of a machine tool, and showing one form of clamp unit exemplifying the invention described herein;

FIG. 2 is an enlarged fragmentary sectional view taken in the plane of the line 2—2 of FIG. 1, and showing the illustrative clamp unit in its relaxed position;

FIG. 3 is a further enlarged fragmentary sectional view showing particularly the clamp unit as illustrated in FIG. 2, but in its actuated or engaged position;

FIG. 4 is a longitudinal sectional view of the clamp unit of FIG. 1 taken in the plane of the line 4—4 of FIG. 2;

FIG. 5 is a side elevational view, in partial section, of the illustrative clamp unit as shown in FIG. 4;

FIG. 6 is an enlarged transverse sectional view of the clamp unit taken along line 6—6 of FIG. 4;

FIG. 7 is an enlarged perspective view of the segmented ring of the latching mechanism of the invention;

FIG. 8 is a perspective view of the clamping shoe;

FIG. 9 is a diagrammatic view based on FIG. 6 and showing the general clamping action of the device;

FIG. 10 is a plan view of a modified form of clamp unit also exemplifying the present invention;

FIG. 11 is an enlarged transverse sectional view through the modified clamp unit of FIG. 10 and taken in the plane of line 11—11;

FIG. 11A is a diagrammatic view based on FIG. 11 and showing the general action of the modified clamp unit;

FIG. 12 is a perspective view of the clamping shoe and its support bar as utilized in the clamp unit of FIG. 10.

While the invention is susceptible of various modifications and alternative constructions, certain illustrative embodiments have bene shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more particularly to the drawings, the invention is there shown embodied in an illustrative clamp unit 20 interposed between two relatively slidable machine elements 21, 22 of a machine tool 24. The latter may have a variety of configurations and, in this instance, comprises a rigid frame or bed 25 with a pair of laterally spaced load bearing slideways 26 situated on its upper surface. The element 21, which may be a saddle, is slidably mounted on the ways 26 of the bed. The saddle is in turn, provided with load bearing slideways 28 which support the machine element 22, in this instance a work table, for relative sliding movement therealong (FIGS. 1 and 2).

The clamp unit 20 is mounted in close proximity to the ways 28 of the saddle. It is adapted to clamp the machine elements 21, 22 together rigidly but releasably at any selected position within the limits of their relative sliding movement. The unit 20 may be operated by any suitable power means and, in this case, such means comprise a hydraulic actuator 29. The construction and arrangement of the unit 20 is such that it is adapted to clamp and release efficiently without deflecting or disturbing the machine elements 21, 22 in any way.

In order to effect clamping and release without deflection or disturbance of the machine elements 21, 22, the clamp unit 20 is mounted independently of the load bearing slideways and provided with balanced clamping elements displaceable to a limited extent and only in a direction normal to the plane of relative sliding movement of the machine elements 21, 22. In furtherance of such objective, the unit 20 comprises a clamping rail 30 fixed to one of said machine elements, in this case the table 22, and a jaw assembly 31 fixed to the other machine element, in this case the saddle 21, for limited floating movement in a direction normal to the plane of relative sliding movement between the table and saddle.

The clamping rail 30 is formed within a substantially I-shaped cross section. The upper portion of the rail is rigidly secured as by means of longitudinally spaced machine screws 32 to the depending portion 34 of the table 22 adjacent one of the saddleways 28. The rail cross section is laterally enlarged in this region so as to underlie a portion of the way 28 and thus serve as a holddown means for the table. The lower portion of the clamping rail 30 is also laterally enlarged and has defined therein a pair of relatively heavy flanges 35 separated by a relatively wide outwardly flared longitudinal groove 36. The tops of the flanges 35 have frictional clamping surfaces 38 defined thereon and which in this instance are substantially horizontal. The portions of the flanges 35 flanking the groove 36 have opposed frictional clamping surfaces 39 defined thereon (FIGS. 2, 3 and 6).

The jaw assembly 31 comprises a clamping shoe 40 independently mounted adjacent the lower portion of the clamp rail 30 and a yoke or body 41 disposed in partially surrounding and straddling relation with the clamping rail and clamping shoe. The body 41 is housed in an appropriate recess 42 in the saddle 21 and mounted for limited floating movement in a direction normal to the plane of relative sliding movement between table and saddle. The body 41 is attached, as by means of screws 43, to a longitudinally rigid, transversely flexible plate 44 which, together with underlying springs 45, provide such limited floating movement. The plate 44 shrouds the housing recess 42 and is secured to the saddle as by screws 46 along its longitudinal edges. The plate 44 has a closely fitting central aperture 47 permitting the upper portion of the body to extend therethrough. This permits a portion of the clamp to extend upwards about the flanges 35 and the clamping shoe 40. The clamping shoe 40 is mounted above the plate 44 and in the present instance is formed as an integral portion of a bar 48 extending across the recess 42 and anchored to the saddle as by means of cap screws 49. The bar 48, like the plate 44, is longitudinally rigid but designed with limited transverse flexibility which is utilized in the operation of the clamp unit. The clamping shoe 40 has a pair of mutually inclined opposed frictional clamping surfaces 50 defined on its sides and which are adapted to abuttingly engage and coact with the surfaces 39 of the clamping rail 30. By the same token, the upper portion of the body 41 has defined therein a pair of jaws 51 overlying the clamping rail flanges 35. The jaws 51 have defined on their lower faces frictional clamping surfaces 52 which are adapted to abuttingly engage and coact with the frictional clamping surfaces 38 of the clamping rail.

Provision is made for actuating the clamp unit 20 with a high degree of clamping efficiency and in a manner whereby the substantial clamping forces applied between the jaw assembly 31 and the clamping rail 30 will be balanced. This is accomplished in the present instance by means of a double wedge arrangement between the force applying means and the clamping elements. Accordingly, the clamp body 41 is formed with a relatively large central longitudinal recess 54 which may have a hardened base plate 55 extending along the bottom thereof. Mounted on antifriction means such as needle or roller bearings 56 which bear on the base plate is a traveling wedge 58, the latter being proportioned so as to slide freely in the longitudinal recess 54. The upper and lower surfaces of the wedge 58 are disposed so as to converge at a relatively small angle. Also mounted in the recess 54, but adapted to slide vertically rather than longitudinally thereof, is a wedge block 59. The latter has upper and lower surfaces which converge at the same angle as those in the traveling wedge 58 and is adapted to bear against the wedge 58 through needle or roller bearings 60 similar to the bearings 56. The upper surface of the wedge block 59 is, in turn, adapted to bear against the underside of the clamping shoe 40 and to urge the same into the flared groove 36 at the clamping rail. The clamping shoe 40, like the groove 36, is of generally trapezoidal cross section and so proportioned that its inclined frictional clamping surfaces 50 will wedgingly engage the corresponding inclined clamping surfaces 39 of the clamping rail groove with substantial clearance left between the top of the shoe 40 and the inner horizontal face of the groove 36.

Upon the application of a longitudinal driving force to the larger end of the traveling wedge 58, the latter moves longitudinally of the recess 54 and pushes the wedge block 59 against the clamping shoe 40. Simultaneously, the body 41 is drawn downwardly and the clamping shoe 40 is forced upwardly so that opposed abutting engagement takes place between the frictional clamping surfaces 38, 52 on the clamping rail 30 and the clamping jaws 51, and between the frictional clamping surfaces 39, 50 on the clamping rail 30 and clamping shoe 40. As indicated in FIG. 9, the frictional clamping forces on the surfaces 38, 52 are balanced against those on the surfaces 39, 50 in a sort of "squeezing" action. The absence of lubricant film on the abutting clamping surfaces, made possible by their separation from the load bearing slideways, permits the development of increased clamping forces for a given applied force. The parts are normally maintained with only a small clearance, on the order of a few thousandths of an inch, between the frictional clamping surfaces when the clamp unit 20 is in its relaxed condition. This is achieved through the action of the springs 45 and the plate 44. Due to the fact that the clamping surfaces do not have to move any appreciable distance when the clamp is operated to grip the clamping rail, and to the balanced application of clamping forces, there is no tendency to introduce deflection or distortion in the machine elements being clamped.

Power operation of the clamp unit 20 is achieved through connection of the hydraulic actuator 29 to the traveling wedge 58. Referring more specifically to FIGS. 2, 4, and 5, it will be noted that the actuator 29 comprises a cylinder 61 fixed to the body or yoke 41 and having a main piston 62 and piston rod 64 reciprocally mounted therein. One end of the piston rod 64 extends toward the body 41 and is threaded or otherwise rigidly fixed to the traveling wedge 58. Pressure fluid from an appropriate source (not shown) may be supplied to the actuator 29, or withdrawn therefrom, via ports 65, 66 and suitable conduits. The stroke of the piston 62 extends substantially from the port 65 at the left-hand end of the cylinder 61 (as viewed in FIG. 4) to an internal collar or snap ring 68 situated in the cylinder adjacent the port 66 and which serves as a stop abutment. With the arrangement thus far described, pressure fluid applied to the left-hand face of the piston 62 via the port 65 (as viewed in FIG. 4), with the port 66 connected to drain, serves to drive the piston, piston rod, and traveling wedge 58 to the right so as to clamp the unit 20. By the same token, pressure fluid applied to the right-hand face of the piston 62 via the port 66, with the port 65 connected to drain, tends to force the piston, piston rod, and traveling wedge 58 to the left so as to unclamp or relax the unit 20.

For the purpose of maintaining the unit 20 in its clamped condition against any tendency of the traveling wedge 58 to seek its releasing position upon relief or loss of hydraulic pressure on the left-hand face of the main piston 62, a self-latching means may be provided. In the present instance, such means comprises a one-way clutch 69 housed within the cylinder 61 and adapted to cooperate with the piston rod 64 to prevent retrograde movement thereof after the unit has been clamped. While the self-latching means may be dispensed with in applications such as the present one where the clamp unit is interposed between a saddle and a machine table, such means finds particular utility in vertical applications as where the clamp unit is interposed between a headstock and its supporting column.

The one-way clutch 69, which is susceptible of a variety of specific forms, in this case includes a relatively heavy annular plate 70 supported in the cylinder 61 about the piston rod 64 by any suitable means, such as snap rings 71. The plate 70 has centrally defined therein a generally frusto-conical aperture 72 which is situated with its smaller diameter end toward the head of the cylinder 61. The aperture 72 defines a raceway for a segmented latching ring 74 (FIGS. 4, 5, and 7) positioned therein and disposed in surrounding relation with the piston rod 64. The segmented ring 74 is continuously biased toward the left (as viewed in FIGS. 4 and 5) by means of a spring 75 guided on the piston rod and disposed between the end wall 76 of the cylinder and the ring 74. It will, accordingly, be appreciated by those skilled in the art that movement of the piston rod 64 toward the left or releasing position will cause the segmented ring 74 to wedge in the aperture or raceway 72 and arrest further movement of the rod in that direction. Movement of the piston rod to the right, however, is not inhibited by the clutch 69, and the unit 20 may be readily clamped without interference from the latching means.

Provision is made in the clamp unit 20 for effecting rapid release of the self-latching means, or clutch 69, as an incident to application of fluid pressure to the actuator to release the unit. In furtherance of such objective, the cylinder 61 has mounted therein an auxiliary piston 78 which is freely slidable on the piston rod 64. The piston 78 is disposed for limited reciprocating movement within the cylinder by the adjacent snap ring 71 of the clutch and a snap ring 79 adjacent the port 66. The piston 78 is formed with an annular boss or hub 80 integral therewith and having a diameter of appropriate size to enter the small diameter end of the aperture 72 and engage the segmented latching ring 74.

Turning now to the operation of the releasing means, let it be assumed that the unit 20 is in clamped condition, indicated in FIG. 5, with the main piston 62 at the right-hand end of its stroke adjacent the port 66. Upon application of releasing fluid pressure to the port 66, with the port 65 connected to drain, pressure fluid fills the space in the cylinder between the main piston 62 and the auxiliary piston 78. This tends to force the auxiliary piston 78 to the right, striking a hammer blow on the segmented latching ring 74 and releasing the grip of the latter upon the piston rod 64. The restraint having been lifted, the piston 64 thereupon moves to the left along with the piston rod and traveling wedge, releasing the unit 20. Upon return of the main piston 62 to the position of FIG. 4, the port 66 is connected to drain and the auxiliary piston 78 tends to return to the position shown in FIG. 4. At this point, the table 22 and element 21 are again free to move relative to one another.

Upon reflection, it will be further appreciated that the clamp unit 20 is susceptible of being preassembled and readily installed in a machine tool, either as original equipment or as a subsequently mounted auxiliary. This is made possible in large measure by compact structural organization of the jaw assembly, including the clamping shoe 40 and its bar 43, about the flexible plate 44. In addition to serving in this capacity, and as an accurate supporting and locating means for the unit 20, the plate 44 also serves as a protective enclosure for the internal members of the unit 20, guarding against the entry of dirt, chips, and other foreign matter which would otherwise tend to impair satisfactory operation.

Referring next to FIGS. 10–12, inclusive, there is shown a clamp unit 20A somewhat similar to the unit 20 described above and also representing an illustrative embodiment of the invention. Since the units 20A and 20 have a number of parts in common, like reference numerals will be used for such parts. The particular environment in which the unit 20A is shown happens to be the same as that described earlier herein, the unit 20A being interposed between two relatively slidable elements 21, 22 of a machine tool and arranged for operation independently of the load bearing slideways thereof. The clamp unit 20A comprises a clamping rail 81 fixed to the machine element 22, which happens to be the table, and a jaw assembly 82 fixed to the machine element 21, which happens to be the saddle, for limited floating movement in a direction normal to the plane of relative sliding movement between the table and saddle.

In the present instance, the clamping rail 81 is somewhat similar in cross section to the clamping rail 30, but has a lower portion which is more nearly in the shape of an inverted T. This defines in such lower portion a pair of relatively heavy flanges 84. The tops of the flanges 84 have substantially horizontal frictional clamping surfaces 85 formed thereon. The bottom or opposite surfaces of the flanges 84 are coplanar and constitute the marginal edge portions of a flat frictional clamping surface 86 substantially parallel with the surfaces 85 and which is actually the outer face of the rail 81 (FIG. 11).

The jaw assembly 82 comprises a clamping shoe 88, mounted in close proximity to the lower portion of the clamping rail 81, and a yoke or body 89 disposed in partially surrounding and straddling relation with the rail 81 and shoe 88. The body 89, like the body 41, may be housed in a suitable recess 42 in the saddle 21 and mounted for limited floating movement normal to the plane of relative sliding movement between the table and saddle.

The clamping shoe 88 (FIGS. 10, 11 and 12) in the present instance happens to be of rectangular cross section and is defined by the central portion of a relatively heavy, longitudinally rigid bar 90 which spans the recess 42. The bar 90 is fixed to the saddle as by means of dowel pins 91 and cap screws 92 and is rigid in a direction parallel to the plane of relative sliding movement between the table and saddle. The characteristics of the bar 90 do, however, permit limited transverse flexibility in a direction normal to such plane of relative sliding movement as an incident to operation of the clamp unit 20A. The upper face of clamping shoe 88 has a frictional clamping surface 93 adapted to enter into abutting engagement with the frictional clamping surface 86 of the rail 81. The upper portion of the yoke or body 89 has a pair of opposed jaws 97 overlying the clamping rail flanges 84. Frictional clamping surfaces 94 defined on the lower faces of the jaws 97 are adapted to abuttingly engage the frictional clamping surfaces 85 of the rail. Upon actuation of the unit 20A, such engagement occurs in balanced opposition to the abutting frictional engagement of the surfaces 86, 93.

For the purpose of providing limited floating movement of the yoke or body 89 in a direction normal to the plane of relative sliding movement between the table and saddle, resort is had to the springs 45 interposed between the bottom of the body 89 and the floor of the recess 42 in the saddle. By the same token, the clamping shoe bar 90 is formed with relieved lateral edges 95 substantially coextensive in length with the clamping shoe and the body 89. Thus, as indicated in FIGS. 10 and 12, the bar 90 widens out on either side of the body 89 and the parts are proportioned so that the latter is maintained in a definite longitudinal position relative to the bar 90 but susceptible of sliding or floating movement in a direction transversely of the bar. Cover plate 96, somewhat similar to the plate 44 of the unit 20, in this instance is used simply as a protective enclosure and is not relied upon for support or positioning of the body 89. Under normal circumstances, with the clamp unit 20A in relaxed condition, the springs 45 support the body 89 with sufficient force to maintain clearance between frictional clamping surfaces 85, 94, 86, 93.

Actuation of the clamp unit 20A is somewhat similar in this case to that of the unit 20 and need not be described in detail. It might be noted in passing that the unit 20A utilizes for this purpose the traveling wedge 58 and cooperating wedge block 59 similar to those of the unit 20 and adapted to operate in a similar manner, being housed in central recess 54. The body recess 54 may include, in addition to the base plate 55, a pair of opposed side plates 98, 99 adapted to bear against the ends of the needle or roller bearings 55, 66. The side plates 98, 99 are floatably mounted and biased into engagement with the bearing ends as by means of a plurality of resilient plungers 100. The traveling wedge 58 may be driven by hydraulic actuator 29 similar to that of the unit 20. A dog member 101 may be secured to the end of the wedge 58 remote from the actuator 29 for coaction with a limit switch or valve 102 to control the application of power.

When the clamp unit 20A is actuated, as indicated in FIG. 11A, it will be noted that the traveling wedge 58 urges the wedge block 59 upwardly of the yoke or body 89, deflecting the clamping shoe 88 and its support bar 90 upwardly and drawing the jaws 92 of the body 89 downwardly to effect frictional engagement between the abutting frictional clamping surfaces 85 on the tops of the rail flanges and the undersides 94 of the jaws. These forces will be balanced against the frictional clamping forces between the upper face 91 of the clamping shoe and the lower face 86 of the clamping rail. Since all such forces are balanced and applied independently of the load bearing slideways between the saddle and table, the reaction force will be the relatively slight amount required to deflect the clamping shoe bar 90 a few thousandths of an inch transversely into contact with the clamping rail. The unit 20A may thus be operated without deflecting the saddle and table or disturbing their relative position of adjustment.

I claim as my invention:

1. A clamp unit for machine tools having at least two elements mounted slidably relative to each other, said clamp unit comprising, in combination, a clamping rail fixed to one said element and having a depending portion of laterally enlarged cross section, a clamping shoe fixed to the other said element in proximity to said depending portion, a clamp body mounted on said other element and having a portion disposed in nested relation about said clamping shoe and said depending portion, a traveling wedge slidably disposed in said body, a wedge block interposed between said traveling wedge and said clamping shoe, and means on said body for moving said traveling wedge relative to said body and to said wedge block for compressing said clamping shoe and said nested portion of said body into opposed frictional gripping engagement with said laterally enlarged depending portion of said clamping rail.

2. A clamp mechanism for machine tool elements movable relative to each other and comprising, in combination, a clamping rail fixed to one said element, a clamping shoe fixed to the other said element, a clamp yoke secured to said other element and disposed in partially surrounding and straddling relation with said clamping rail and said clamping shoe, and means positioned in said clamp yoke and cooperable therewith for pressing the latter and said clamping shoe into opposed frictional gripping engagement with said clamping rail.

3. A clamp unit for selectively clamping two relatively slidable machine tool elements and comprising, in combination, a clamping rail on one said element, a clamping shoe on the other said element, a clamp body on the other said element, means on said body for pressing the latter and said shoe into engagement with said clamping rail, a hydraulic actuator connected to said pressing means and adapted to drive the same into clamping position, and a releasable latch connected to said hydraulic actuator for maintaining said pressing means in clamped position upon release of pressure on said hydraulic actuator.

4. A clamp unit for releasably holding two machine tool elements mounted for relative sliding movement with respect to each other, said unit comprising the combination of a rail fixed to one said element and having a longitudinal groove therein, a clamp body mounted on the other said element and disposed in nested relation with said rail, a first wedge mounted on said other element and disposed for engagement with the longitudinal groove of said rail, a second wedge slidably mounted on said body, and means connected with said body and with said second wedge for shifting the same and thereby applying clamping pressure to said first wedge.

5. A unitary clamping device for selectively securing machine elements movable relative to one another, one of said elements having a clamping rail depending therefrom, and another of said elements having a clamping shoe in juxtaposition with said clamping rail, said clamping device comprising, in combination, a yoke mounted in position straddling said clamping rail and said clamping shoe, a block slidable in said yoke and engageable with said clamping shoe, and means in said yoke interposed between the latter and said block for urging them apart, whereby said clamping shoe and said clamping rail are squeezed into frictional engagement.

6. A removable clamping assembly for selectively securing machine tool elements movable relative to one another, wherein one of said elements has a clamping rail depending therefrom, and another of said elements has a clamping shoe in juxtaposition with said clamping rail, said clamping assembly comprising, in combination, a yoke mounted in position straddling said clamping rail and said clamping shoe, a block slidable in said yoke and engageable with said clamping shoe, a wedge in said yoke interposed between the latter and said block, a hydraulic motor connected with said wedge for selectively moving the same and urging said block and said yoke apart, whereby said clamping shoe and said clamping rail are squeezed into frictional engagement.

7. A clamping assembly for selectively securing elements of a machine tool otherwise relatively movable along interfitting load bearing slideways, said assembly comprising the combination of a clamping rail on one said element separate from the load bearing slideways thereof, a clamping shoe on another said element separate from the load bearing slideways thereof, said clamping shoe being disposed in juxtaposed spaced apart relation with said rail and having limited flexibility transversely thereof, a clamping yoke on said other element mounted for limited floating movement transversely of said clamping rail, a pair of opposed jaws extending from said yoke, said clamping rail and said clamping shoe being nestably received between said jaws and said yoke, a slidable block in said yoke between said jaws, and means cooperable with said block and said yoke for moving them relatively, whereby said clamping rail and shoe are squeezed into balanced frictional engagement by and between said block and said jaws without deflection of said machine elements relative to each other.

8. Clamping apparatus for selectively securing machine tool elements movable relative to one another, a clamping rail depending from one of said elements, said clamping rail being formed with an axially extending groove having converging side walls, and another of said elements having a clamping shoe in juxtaposition with said clamping rail, said clamping shoe having a wedge-shaped section formed with side walls adapted to be received in said groove, a unitary clamping device comprising, in combination, a casing mounted in position straddling said clamping rail and said clamping shoe, a block slidable in said casing and engageable with said clamping shoe, and means in said casing interposed between said casing and said block for urging them apart, whereby said clamping shoe and said clamping rail are squeezed into frictional engagement.

9. Clamping apparatus for selectively securing elements of a machine tool otherwise relatively movable, including a separate clamping rail on one said element, a separate clamping shoe on another said element in juxtaposition with said rail, and further including a unitary clamping device, comprising a casing mounted on one of said elements, opposed jaws extending from said casing, said clamping rail and said clamping shoe being nestably received between said jaws and said casing, a wedge slidably disposed in said casing, a block in said casing between said jaws and interposed between said wedge and said clamping shoe, said wedge being cooperable with said block and said casing for moving them relatively, whereby said clamping rail and shoe are squeezed into frictional engagement between said block and said jaws.

10. Clamping apparatus for selectively securing elements of a machine tool otherwise relatively movable, including a separate clamping rail on one said element, a separate clamping shoe on another said element in juxtaposition with said rail, and further including a removable unitary clamping device, comprising a casing, opposed jaws extending from said casing, said clamping rail and said clamping shoe being nestably received between said jaws and said casing, a slidable block in said casing between said jaws and contiguous with said clamping shoe for selectively urging the same toward said rail, and means cooperable with said block and said casing for moving them relatively, said last-named means comprising an antifriction wedging block said clamping device including a hydraulic motor selectively operable for moving said wedge, a one-way device in said motor for preventing movement of said wedge when said motor is inoperative, and latch override means for releasing said one-way device as an incident to application of releasing fluid pressure to said motor.

11. A clamp mechanism for machine tool elements movable slidably relative to each other in a given plane and comprising, in combination, a clamping rail fixed to one said element, a clamping shoe fixed to the other said element, a clamp body secured to said other element and disposed in partially surrounding and straddling relation with said clamping rail and said clamping shoe, means on the other said element supporting said clamping shoe and said clamp body rigidly in a direction parallel to said plane of relative sliding movement but with limited float in a direction normal to said plane, and means on said clamp body for pressing the latter and said clamping shoe into opposed frictional gripping engagement with said clamping rail.

12. A unitary clamping device for selectively securing elements of a machine tool movable relative to one another, one of said elements having a clamping rail of inverted and generally T-shaped cross section depending therefrom, another of said elements having a clamping shoe of generally rectangular cross section in juxtaposition with said clamping rail, said clamping device comprising, in combination, a body, jaws extending from said body into straddling relation with said clamping rail and shoe, a block slidable in said body intermediate said jaws and adapted to abut said clamping shoe and urge the same in the direction of said clamping rail, and means in said body for shifting said block relative to the latter and in the direction of said clamping rail whereby said clamping shoe and clamping rail are squeezed into frictional engagement between said jaws and said block.

13. A clamp mechanism for machine tool elements movable relative to one another and comprising, in combinations, a clamping rail depending from one of said elements, a clamping shoe on another said element, said clamping shoe comprising a portion of a generally rectangular beam of reduced cross section intermediate the ends thereof, said reduced cross-sectional portion and said clamping rail having juxtaposed mating frictional surfaces, a clamping yoke, opposed jaws extending from said yoke with said clamping rail and reduced cross section portion nested between said jaws, said clamping rail and said jaws also having mating frictional surfaces, and clamp actuating means in said yoke effective to squeeze said mating surfaces into frictional contact between said jaws and said yoke.

References Cited by the Examiner
UNITED STATES PATENTS

| | | | |
|---|---|---|---|
| 419,073 | 1/90 | Richards | 269—234 |
| 1,578,656 | 3/26 | Gordon | 29—1.5 |
| 2,185,304 | 1/40 | Knapp | 29—1.5 |
| 2,768,406 | 10/56 | Carle | 29—1.5 |
| 2,813,518 | 11/57 | Diskel et al. | 121—40 |
| 2,851,995 | 9/58 | Westcott | 121—40 |
| 2,914,362 | 11/59 | Ott | 308—3 |
| 3,077,134 | 2/63 | Ronick | 83—700 |

WHITMORE A. WILTZ, *Primary Examiner.*

RICHARD H. EANES, JR., *Examiner.*